US010031976B2

(12) United States Patent
Sinha et al.

(10) Patent No.: US 10,031,976 B2
(45) Date of Patent: Jul. 24, 2018

(54) PERSONALIZATION PLATFORM (71) Applicant: PayPal, Inc., San Jose, CA (US)

(72) Inventors: Ranjan Sinha, San Jose, CA (US);
Charles Bracher, Santa Cruz, CA (US); Matthias Spycher, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 497 days.

(21) Appl. No.: 14/680,018

(22) Filed: Apr. 6, 2015

(65) Prior Publication Data
US 2015/0286645 A1 Oct. 8, 2015

Related U.S. Application Data (60) Provisional application No. 61/976,456, filed on Apr. 7, 2014.

(51) Int. Cl.
*G06F 17/30* (2006.01)
(52) U.S. Cl.
CPC .. *G06F 17/30867* (2013.01); *G06F 17/30699* (2013.01)
(58) Field of Classification Search
CPC ............... G06F 17/30699; G06F 17/30386
See application file for complete search history.

(56) References Cited

U.S. PATENT DOCUMENTS

2002/0152463 A1* 10/2002 Dudkiewicz ...... G06F 17/30817
725/46
2002/0171670 A1* 11/2002 Clernock .............. G06F 3/0481
345/629
2003/0233345 A1* 12/2003 Perisic .............. G06F 17/30867
2009/0119289 A1* 5/2009 Gibbs .................. G06F 17/3064
(Continued)

FOREIGN PATENT DOCUMENTS

WO WO-2015157314 A1 10/2015

OTHER PUBLICATIONS

Bruns et al., "Tools and Methods for Capturing Twitter Data during Natural Disasters", 2012; First Monday, vol. 17, No. 4, Apr. 2012.*

(Continued)

*Primary Examiner* — Apu Mofiz
*Assistant Examiner* — Sheryl Holland
(74) *Attorney, Agent, or Firm* — Maschoff Brennan (57) ABSTRACT A personalization system includes a user events module configured to receive a plurality of user events, each user event of the plurality of user events including one or more of a transactional event and a behavioral event associated with the online user, and a personalization cluster including a plurality of personalization servers, each personalization server of the plurality of personalization servers configured to receive a personalization request from a requesting system, the personalization request including a plurality of intermediate results identified by the requesting system, each intermediate result representing a possible outcome that may be presented by the requesting system to the online user, compute a score for each intermediate result of the plurality of immediate results based at least in part on the plurality of user events, thereby generating a plurality of scores, and return the plurality of scores to the requesting system.

20 Claims, 6 Drawing Sheets (56) References Cited

U.S. PATENT DOCUMENTS

| | | | | |
|---|---|---|---|---|
| 2009/0164452 A1* | 6/2009 | Yogaratnam | ...... | G06F 17/30867 |
| 2010/0250558 A1* | 9/2010 | Wang | ...... | G06Q 30/02 |
| | | | | 707/749 |
| 2011/0010371 A1* | 1/2011 | Xu | ...... | G06F 17/30979 |
| | | | | 707/749 |
| 2014/0280221 A1* | 9/2014 | Chuang | ...... | G06F 17/3053 |
| | | | | 707/748 |

OTHER PUBLICATIONS

"International Application Serial No. PCT/US2015/024754, International Search Report dated Jul. 20, 2015", 2 pgs.
"International Application Serial No. PCT/US2015/024754, Written Opinion dated Jul. 20, 2015", 5 pgs.

\* cited by examiner

PERSONALIZATION PLATFORM

CROSS-REFERENCE TO RELATED APPLICATIONS

The present application claims the priority benefit of U.S. Provisional Patent Application Ser. No. 61/976,456 filed on Apr. 7, 2014 and entitled "Personalization Platform," which is incorporated herein by reference.

TECHNICAL FIELD

Embodiments of the present disclosure relate generally to data analysis, and more particularly, but not by way of limitation, to personalization platform.

BACKGROUND

In recent years, a vast amount of information relating to various user activity and behaviors has rapidly become available.

BRIEF DESCRIPTION OF THE DRAWINGS

Various ones of the appended drawings merely illustrate example embodiments of the present disclosure and cannot be considered as limiting its scope.

Like numbers in the figures indicate like components.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Example embodiments provide systems and methods for personalization modeling using various user data. Personalizing a user experience (e.g., using a website or e-commerce site) provides a number of advantages. For instance, personalization may enable more relevant experiences for the user, retention of existing users, new user acquisitions, reactivating churned users, increasing activity per user, improving conversion from visits to transactions, and so on. Personalization may take the form of personalized search rankings/search autocomplete, website layout, onsite ads, user preferences (e.g., the item condition a user may prefer when purchasing an item from an e-commerce website), deals, featured products, and so forth.

Personalization may be achieved by analyzing and modeling user data. For instance, propensity models may be developed and used to determine the likelihood of a user action. In this instance, personalization may be performed based on the likelihood of various user actions (e.g., the user may have a high propensity to purchase discounted items, as a result the user experience may be personalized to feature more discounted items).

The user data may include a variety of different types of information from a variety of sources. For example, the user data may include user profile information (e.g., user demographic information such as account id, gender, age, region, ethnicity, marital status, socioeconomic status, and the like), purchase history, browsing history, search history, item "watch" data (e.g., when the user marks an item for tracking purposes), other engagement information, contextual information (e.g., current location of user, user interaction with user interfaces, sensor data from a device of the user, and so forth), and other information such as timing information for any of the above. The user data may be access from many difference sources such as e-commerce sites, social networking sites, a user device, and so on, as well as the personalization system and components described herein.

In some embodiments described herein, a personalization platform provides various personalization functionalities using the user data. For example, the personalization platform may provide controlled access to the user data, enable event processing at near real-time, maintain activity timelines of the user data, enable in-session targeting, provide environment for predictive model evaluation, backup and restore the user data, and so forth. In one example embodiment, the platform may be implemented using in part the Apache Cassandra database.

The term "search autocomplete", as used herein, refers to an aspect of search functionality provided by, e.g., a search engine for an ecommerce site, that provides anticipatory guidance for a user entering data into a search field (i.e., prior to the user submitting/executing the search). A search engine may receive an initial entry of characters (a "query fragment") from the user as the user types in the search field. The search engine may analyze those initial characters and provide one or more options or "suggestions" of complete search terms that conform to the initial characters entered by the user. This feature or functionality within the search field is referred to herein as search autocomplete.

Figure 1:
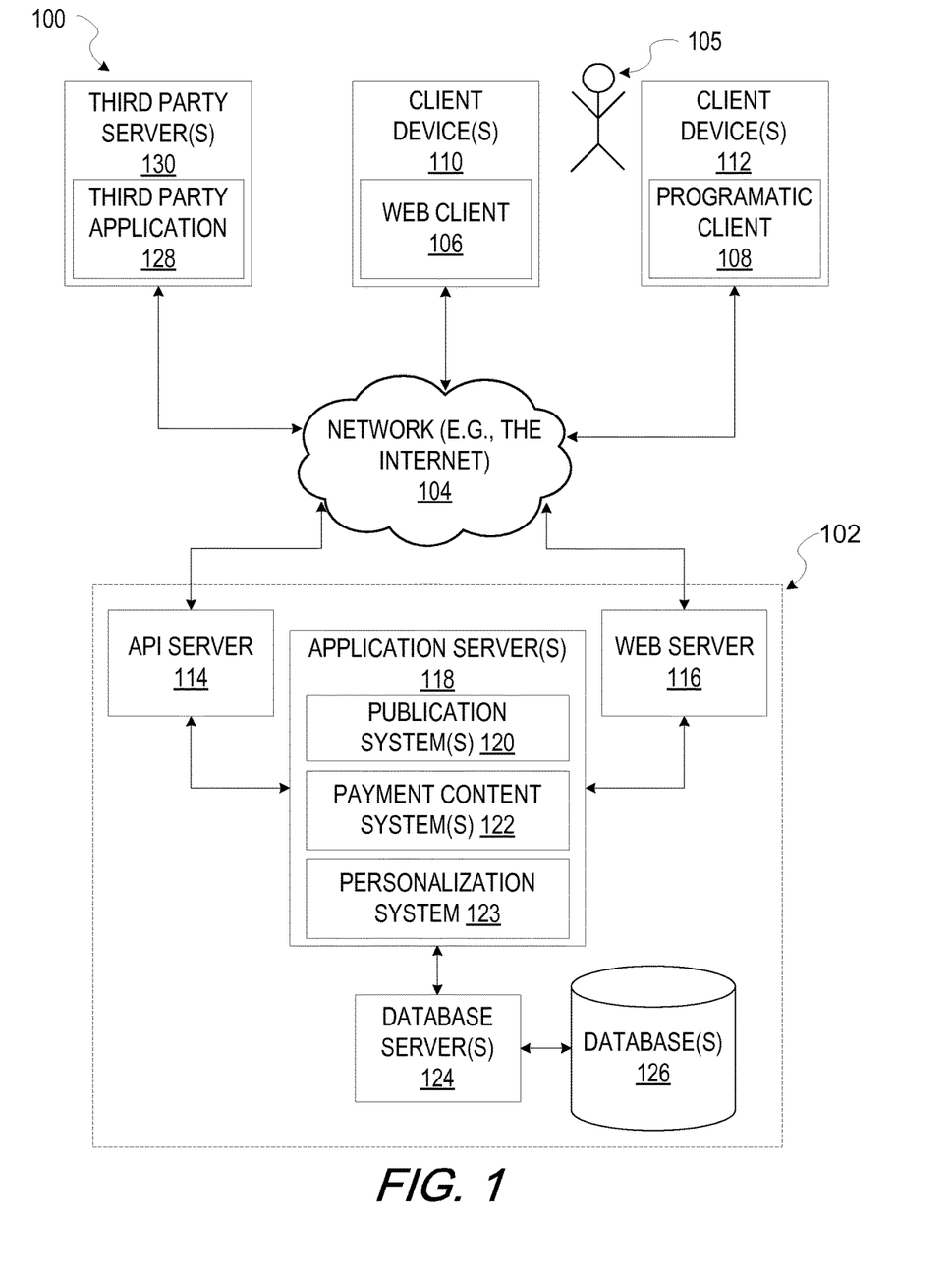
FIG. 1 is a block diagram illustrating an example embodiment of a high-level client-server-based network architecture that may be used to provide personalization services for client devices, their users, and/or third-party servers

FIG. 1 is a diagram illustrating an example embodiment of a high-level client-server-based network architecture 100 that may be used to provide personalization services for, e.g., client devices 110,112, their users 105, and/or third-party servers 130. A networked system 102, in the example, forms a network-based marketplace or payment system, and provides server-side functionality via a network 104 (e.g., the Internet or wide area network (WAN)) to one or more client devices 110 and 112. FIG. 1 illustrates, for example, a web client 106 (e.g., a browser, such as the Internet Explorer® browser developed by Microsoft® Corporation of Redmond, Wash. State), and a programmatic client 108 executing on respective client devices 110 and 112.

The client devices 110 and 112 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client devices 110 and 112 may comprise a display module (not shown) to display information (e.g., in the form of user interfaces). In further embodiments, the client devices 110 and 112 may comprise one or more of a touch screens, accelerometers, gyroscopes, cameras, microphones, global positioning system (GPS) devices, and so forth. The client devices 110 and 112 may be devices of a user that are used to perform a transaction involving digital goods within the networked system 102.

In the example embodiment, the networked system 102 is a network-based marketplace that responds to requests for product listings, publishes publications comprising item listings of products available on the network-based marketplace, and manages payments for these marketplace transactions. One or more users 105 may be a person, a machine, or other means of interacting with client devices 110 and 112. In embodiments, the user 105 is not part of the network architecture 100, but may interact with the network architecture 100 via client devices 110 and 112 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

In some embodiments, each of the client devices 110 and 112 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client devices 110 and 112, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in a given one of the client devices 110 and 112, the given one of the client devices 110 and 112 may use its web browser to access the e-commerce site (or a variant thereof) hosted on the networked system 102. Although two client devices 110 and 112 and one third party server 130 are shown in FIG. 1, more or less than two device machines 110 and 112 and one third party server 130 can be included in the architecture 100.

One or more users 105 may be a person, a machine, or other means of interacting with the client devices 110 and 112. In example embodiments, the user 105 is not part of the network architecture 100, but may interact with the network architecture 100 via the client devices 110 and 112 or another means.

In the example embodiment, an application program interface (API) server 114 and a web server 116 are coupled to, and provide programmatic and web interfaces respectively to, one or more application servers 118. The application servers 118 may host one or more publication systems 120 and payment systems 122, each of which may comprise one or more modules or applications and each of which may be embodied as hardware, software, firmware, or any combination thereof. The application servers 118 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital goods information in accordance with example embodiments.

The publication systems 120 may provide a number of publication functions and services to users 105 that access the networked system 102. The payment systems 122 may likewise provide a number of functions to perform or facilitate payments and transactions. While the publication systems 120 and payment systems 122 are shown in FIG. 1 to both form part of the networked system 102, it will be appreciated that, in alternative embodiments, each system 120 and 122 may form part of a payment service that is separate and distinct from the networked system 102. In some embodiments, the payment systems 122 may form part of the publication system 120.

In the example embodiment, a personalization system 123 provides functionality operable to perform various personalizations using the user data, as described herein. For example, the personalization system 123 may access the user data from database servers 124, databases 126, the third party servers 130, the publication system 120, and/or other sources. In some example embodiments, the personalization system 123 analyzes the user data to perform personalization of, for example, search rankings/search autocomplete, website layout, onsite ads, user preferences, deals, featured products, and so on. In some embodiments, the personalization system 123 may communicate with the publication systems 120 (e.g., accessing item listings) and/or the payment system 122. In an alternative embodiment, the personalization system 123 may be a part of the publication system 120.

Further, while the client-server-based network architecture 100 shown in FIG. 1 employs a client-server architecture, the present disclosure is not limited to such an architecture, and could find application in a distributed, or peer-to-peer, architecture system, for example. The various publication, payment, and personalization system 120, 122, and 123 could also be implemented, in some embodiments, as standalone software programs, which do not necessarily have networking capabilities.

In the example embodiment, the web client 106 accesses the various publication and payment systems 120 and 122 via the web interface supported by the web server 116. Similarly, the programmatic client 108 accesses the various services and functions provided by the publication and payment systems 120 and 122 via the programmatic interface provided by the API server 114. The programmatic client 108 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 108 and the networked system 102.

Additionally, in the example embodiment, one or more third party applications 128, executing on a third party server(s) 130, have programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
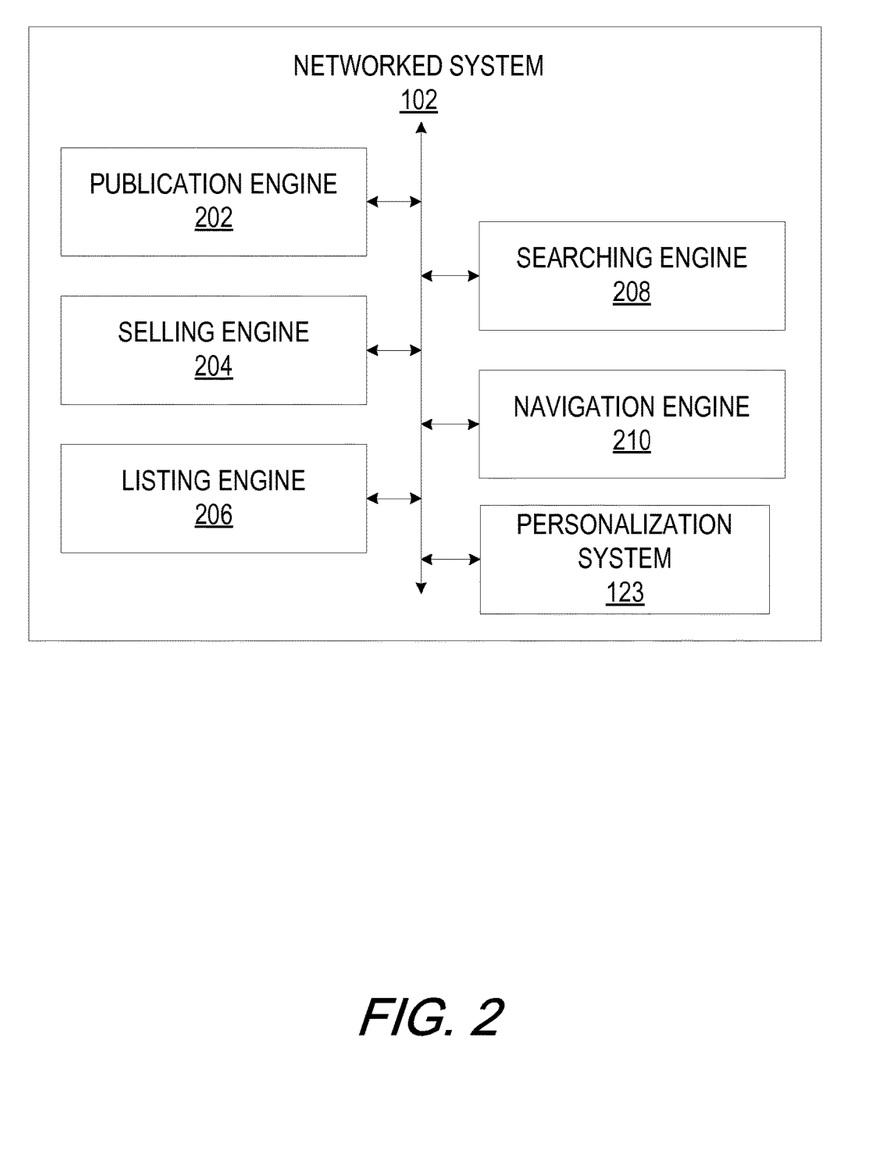
FIG. 2 illustrates a block diagrams showing components provided within the system of FIG. 1 according to some example embodiments.

FIG. 2 illustrates a block diagram illustrating example components provided within the networked system 102 in which personalization services may be provided according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124.

The networked system 102 may provide a number of publishing, listing, and/or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price and/or discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., device machine 110, 112) of the user. The searching engine 208 may record the query (e.g., keywords) and any subsequent user actions and behaviors (e.g., navigations, selections, or click-throughs).

The searching engine 208 also may perform a search based on a location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify, as part of the search query, a radius or distance from the user's current location to limit search results.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

In the example embodiment, personalization system 123 provides personalization services to one or more of the engines 202, 204, 206, 208, and 210 provided by networked system 102. As such, networked system 102 provides personalization services to, for example, client devices 110, 112 and/or third party servers 130 (each shown in FIG. 1).

Figure 3:
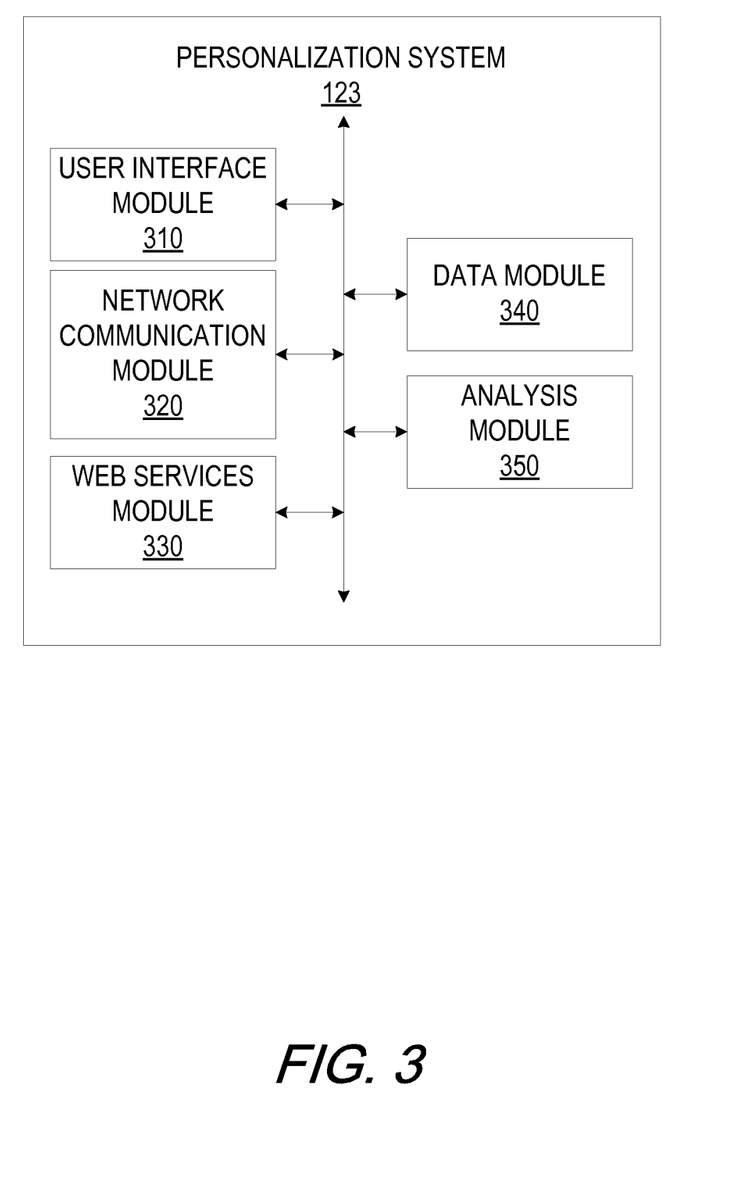
FIG. 3 is a block diagram depicting an example embodiment of a personalization system.

FIG. 3 is a block diagram of the example personalization system 123 that provides functionality operable to perform various personalizations in the architecture 100 (shown in FIG. 1) using, for example, user data stored in databases 126 (shown in FIG. 1). In an example embodiment, the personalization system 123 includes a user interface module 310, a network communication module 320, a web services module 330, a data module 340, and an analysis module 350. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The user interface module 310 may provide various user interface functionality operable to interactively present and receive information from the user 105 and/or computing devices 110, 112 (each shown in FIG. 1). For example, the user interface module 310 may provide a user interface configured to present item listings from an e-commerce website to the user. Information may be presented using a variety of means including visually displaying information and using other device outputs (e.g., audio, tactile, and so forth). Similarly, information may be received by a variety of means including alphanumeric input or other device input (e.g., one or more touch screen, camera, tactile sensors, light sensors, infrared sensors, biometric sensors, microphone, gyroscope, accelerometer, other sensors, and so forth). It will be appreciated that the user interface module 310 may provide many other user interfaces to facilitate functionality described herein. Presenting may mean communicating information to a device (e.g., client devices 110 and 112), the device having functionality operable to present the communicated information. Interactively presenting may mean the exchange of information from the presenting device, the user 105, and the personalization system 123.

In the example embodiment, the network communication module 320 performs various network communication functions such as communicating with networked system 102 (shown in FIGS. 1 and 2), the database servers 124 (shown in FIG. 1), and the third party servers 130 (shown in FIG. 1). Network communication may operate over any wired or wireless means to provide communication functionality.

The web services module 330, in the example embodiment, performs various web services functions such as retrieving information from third party servers 130 and application servers 118. Information retrieved by the web services module 330 may include data associated with the user 105 (e.g., user profile information from an online account, social networking data associated with the user 105, and so forth), data associated with an item (e.g., images of the item, reviews of the item, and so forth), and other data.

In the example embodiment, the data module 340 performs various data functions to facilitate the functionality of the personalization system 123. For example, the data module 340 may access user data corresponding to the user, such as, for example, behavioral events and transactional events performed by the user. The user data may include a wide variety of data and may be accessed from many different sources include the third party servers 130, the data base servers 124, the marketplace system 120, the client devices 110 and 112, and so on.

Further, in the example embodiment, the analysis module 350 may perform various analyses using a variety of data to facilitate the functionality of the personalization system 123. For example, the analysis module 350 may perform an analysis of the user data to personalize search results, website layout, user preferences, and so forth. Many schemes and techniques may be employed by the analysis module 350 to perform personalization.

In some embodiments, the data module 340 may access the user data (e.g., behavioral events and transactional events) from many difference sources such as the publication system 120 (e.g., browsing history from a search site or e-commerce site), the payments system 122 (e.g., purchase history of the user), the databases 126 (e.g., behavior history of the user such as past user interface interactions by the user), the third party servers 130 (e.g., social networking posts from the user or friends of the user), the client devices 110 and 112 (e.g., sensor data such as current location of the user as determined by a GPS component of a mobile device), and other sources.

In the example embodiment, the analysis module 350 generates various personalization models (e.g., models indicating a tendency or likelihood of interest in some things as compared to others) using the user data. The personalization models may be generated using various portions of the user data. In some embodiments, different personalization models may be developed from the user data and tested to determine the most effective personalization model for various personalization objectives (e.g., which models are best for certain types of users, which models are best for certain regions, which models are best for certain browsing session, which models are best for when browsing on certain devices, and so on). In some embodiments, such personalization may include, for example, personalized search results, personalized search auto-complete, and personalized deal offerings. Features that have shown promise in personalization on the web and e-commerce may include, for example, gender and age, user's location, price and category, user's history of search activity, ability of user to read at differing levels of complexity, and patterns of re-finding the same search result. For example, a propensity model may be generated using the user data. The propensity model may model the user propensity for a particular action. The analysis module 350 may perform personalization using the propensity model. For example, if the user has a propensity to purchase goods using the fastest delivery method, the analysis module 350 may personalize the delivery methods to emphasize the faster shipping methods. The personalization may include modifying the user interface, modifying information presented to the user, identifying additional items that may be of interest to the user, and so on.

In some embodiments, the data module 340 may access real-time activity of the user along with other user data. For example, the user data may include real-time data of the user (e.g., a search query fragment), user profile information (e.g., categories of interest), and purchase history data (e.g., past purchases of particular items). The analysis module 350 may generate the personalization models based on the user data and update the personalization models using the real-time data of the user. For example, the analysis module 350 may generate the personalization model using purchase history data of the user. The personalization model may be updated with the real-time data of the user as it is received by the data module 340 (e.g., as the user navigates search results, update the personalization model). The personalization model may then be used in real-time to perform personalization for the user (e.g., determine the user's preferences such as delivery method, product price preference, and so forth).

In some embodiments, the personalization models may be used to determine the user's intent for a particular session. Some users have a tendency to engage in an online session for a particular purpose, referred to herein as the "user's intent". For example, the user intent for a given session may be to find a new mobile phone of a particular brand. Based on the determined intent of the user, the analysis module 350 may perform various personalizations for the user.

Further, in some embodiments, the analysis module 350 may generate the personalization models offline. For example, the data module 340 may access various information from databases that do not necessarily need to be couple to a network.

In some embodiments, the analysis module 350 may generate a timeline of the user data. For example, a browsing session that occurred further in the past may be further down on the timeline as compared to the most recent browsing session of the user. In some example embodiments, the timeline of user data may be presented to the user. In other example embodiments, the timeline may be used to weight various user data in the personalization models (e.g., user data from further in the past is less significant than more recent user data).

In some embodiments, the analysis module 350 may identify long-term behavior or trends based on an analysis of the user data. The long-term trends may be used as a basis for the personalization models.

In some embodiments, different queries by the user may be personalized in a different manner. The analysis module 350 may personalize the query by modifying the search rankings. For some queries, the search ranking may be personalized in the same manner and for other queries, the search rankings may be personalized in a different manner.

In still other embodiments, the user data may use the user data to personalize different portions of the browsing session. For example, historic behavior may provide benefits at the start of a session while short-term behavior (e.g., real-time user data) may contribute to personalization when a user is further into a browsing session. Various combinations of long term and short term behavior of the user may be employed to personalize throughout a session of the user.

In yet other embodiments, product categories of interest (e.g., product categories of interest to the user on an e-commerce site) may inferred based on the user data and personalization models. Item condition that the user is likely interest in may be inferred from the user data (e.g., whether the user seems to prefer used items as opposed to new items). Interest in a specific item may be inferred from the user data.

In some embodiments, personalization may be based, at least in part, on a behavior profile generated from, for example, long-term user behavior (e.g., user "badges", or profile data for the user). Rules, behavior mining, and predictive modeling may be employed to personalize online experiences for the user (e.g., search auto-complete, special deals offerings). For example, sale type (e.g., auction versus buy-it-now), item condition (e.g., new versus used), category (e.g., preference of categories), price (e.g., price ranges of purchasing activity), deals (e.g., propensity to purchase deals), social share (e.g., propensity to share items in social media), and so forth.

Figure 4:
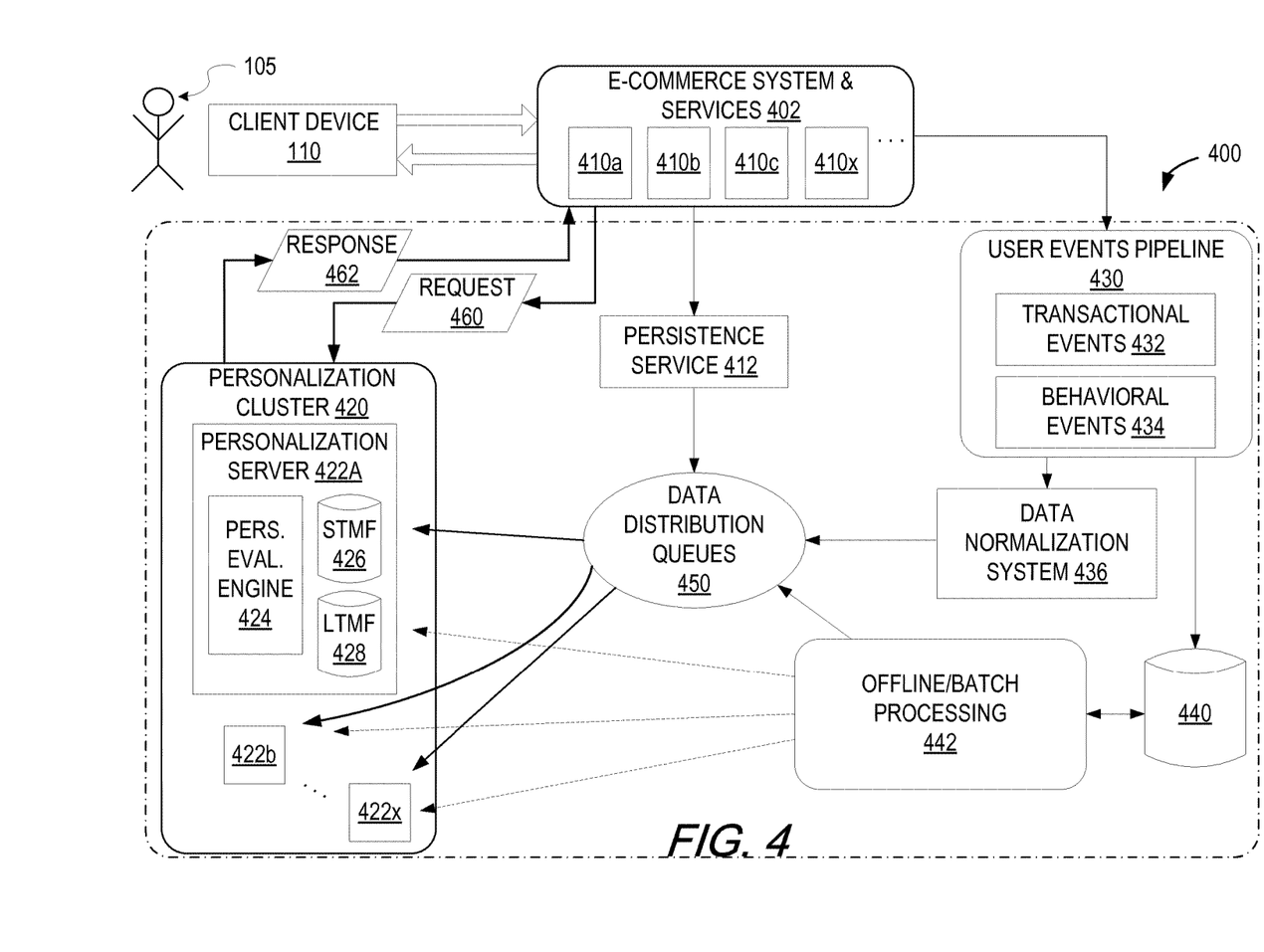
FIG. 4 depicts an example embodiment of a personalization platform that provides personalization services for users and/or client devices.

FIG. 4 depicts an example embodiment of a personalization platform 400 that provides personalization services for user 105 and/or client device 110. In some embodiments, personalization system 400 is similar to personalization system 123. In the example embodiment, personalization platform 400 provides personalization services to client 105 and/or client device 110 via e-commerce system & services 402.

In the example embodiment, e-commerce system & services 402 may include system & services 410a-410x collectively referred to herein as services 410 or "service subsystems" 410. Examples of system & services 410 may include, for example: (i) a searching subsystem 410a (e.g., for providing search and/or search autocomplete functionality to user 105, based on personalization factors such as, for example, price ranges in a target category, preferences relating to new and used items), which may be similar to searching engine 208 (shown in FIG. 2); (ii) a deals subsystem 410b (e.g., for providing featured items and/or deals to user 105), which may be similar to listing engine 206 (shown in FIG. 2); (iii) a publication subsystem 410c (e.g., for providing user access to viewing of items), which may be similar to publication engine 202 (shown in FIG. 2) and/or publication system 120 (shown in FIG. 1); (iv) a selling subsystem 410x (e.g., for executing transactional events with user 105 and/or computing device 110), which may be similar to selling engine 204 (shown in FIG. 2) and/or payment content system 122 (shown in FIG. 1); and other subsystems (not separately shown, e.g., ads subsystem, modeling subsystem) of e-commerce system 402 that may receive user events or otherwise identify user data, and which may leverage personalization services as described herein, such as, for example, a customer service subsystem (e.g., for predicting what a customer coming to a customer service site may have an issue with), a mobile app/web page subsystem (e.g., evaluating what experience to show the user including, for example, colors, positions, text size (accessibility), widgets, and flows of activity, e.g., similar to the publication system), and an ads subsystem (e.g., for retargeting).

In example embodiments, the personalization system 400 performs a variety of different personalization services for the online experiences of user 105, such as personalized search rankings/search autocomplete, website layout, onsite ads, user preferences, deals, featured products, and so forth. In various example embodiments, the personalization system 400 may provide controlled access to the user data, enable event processing at near real-time, maintain activity timelines of the user data, enable in-session targeting, provide environment for predictive model evaluation, backup and restore the user data, and so forth. The personalization system 400 may provide personalization by modeling and analyzing the user data. Many different schemes and techniques may be employed to model and analyze the user data to perform personalization for the user.

Personalization system 400, in the example embodiment, includes a personalization cluster 420. Cluster 420 includes a plurality of personalization servers 422a-422x (collectively, personalization servers 422). Each personalization server 422 includes a short term memory file ("STMF") 426, a long term memory file ("LTMF") 428, a random access memory ("RAM") (not separately shown in FIG. 4) (e.g., including user profile data), and a personalization evaluation engine 424. In the example embodiment, STMF 426 and LTMF 428 are stored on disk storage, and as an instance of a Lambda architecture. In some embodiments, one or more of the STMF 426 and the LTMF 428 may stored, in part or in whole, in RAM or cache memory. The STMF 426 contains the incremental data since the last LTMF 428 was pushed into production. Each user of ecommerce system & services 402 is assigned to a single personalization server 422 (e.g., for purposes of receiving various personalization services provided by personalization platform 400). For example, user 105 may be assigned to personalization server 422*a*. As such, user data associated with user 105 (e.g., historical or recent user events data, propensity data) may be stored or staged in STMF 426 and/or LTMF 428 on personalization server 422*a*.

The user data may include a variety of different types of information from a variety of sources. For example, the user data may include user profile information (e.g., user demographic information such as account id, gender, age, region, ethnicity, marital status, socioeconomic status, and the like), purchase history (e.g., what items the user has consummated a purchase ("purchase events")), browsing history (e.g., what searches the user has performed ("searching events"), what items the user has viewed and/or marked for "watch" ("watch events")), contextual information (e.g., current location of user, user interaction with user interfaces, sensor data from a device of the user, and so forth), and other information. The user data may also include real-time or near real-time data of the user. For example, the user's activity during a particular browsing session (also referred to herein as "in-session data") may be included in the user data (e.g., navigation during a particular browsing session, search terms during a browser session, various interactions with the user interface, and so).

In the example embodiment, user data is generated by user 105 and/or client device 110 via e-commerce system & services 402 and transmitted through a user events pipeline 430 associated with the personalization system 400. User events pipeline 430 identifies events such as transactional events 432 and behavioral events 434, and associated information. Examples of behavioral events 434 may include, for example, (a) search/search autocomplete events (e.g., user 105 submitting a search for "Wayne Gretzky hockey card"); (b) viewing events (e.g., user 105 views a particular listing for a Wayne Gretzky rookie trading card by, for example, clicking on a particular listing generated by the search event, thereby viewing the details of the particular listing); (c) watch events (e.g., user 105 marks the trading card listing as a listing to "watch", or continue to follow, as the listing progresses; and (d) other-user collections (e.g., users following other users' collections). Examples of transactional events 432 may include, for example, (I) user bidding events (e.g., user 105 enters a bid in an auction listing for the Wayne Gretzky trading card, thereby indicating a desire to purchase the item); (II) user purchase events (e.g., user 105 enters a bid that wins the auction listing); (III) best offer events (e.g., user 105 makes a best offer as part of a bid); (IV) best offer remove events (e.g., user 105 removes a best offer); (V) bid lost events (e.g., user 105 is no longer the top bid); (VI) feedback events (e.g., when some other user provides feedback on user 105); and (VII) item sold events (e.g., user 105 sells an item).

In the example embodiment, personalization platform 400 includes a data normalization system 436. In one embodiment, data normalization system 436 converts user events from the user events pipeline 430 into a data framework format as provided by Apache Avro™ (Apache Software Foundation of Forest Hills, Md.). Once converted to Avro format, data normalization system 436 transmits the normalized user events to data distribution queues 450 for distribution to a personalization cluster 420.

In the example embodiment, personalization platform 400 distributes user data such as normalized transactional events 432 and behavioral events 434 associated with users such as user 105 through data distribution queues 450. As described above, each user is assigned to a particular personalization server 422 within personalization cluster 420. As such, queues 450 distribute data associated with a particular user to that user's assigned personalization server 422. For example, user event data associated with user 105 is transmitted to personalization server 422*a* and stored, e.g., in STMF 426 and/or LTMF 428, where other user event data may be transmitted to other personalization servers 422*b*-422*x*. In some embodiments, data in queues 450 are segmented by partition, and by attributes. The partitions are used to segment out large use cases (e.g., data for visitors as opposed to data for users), as well as data which is batched data verses data which is real-time data. Attributes are used to determine which data goes to which end user (e.g., which user 105). In some embodiments, a 1,680 grained filter is used, where each end server 422 has 2*N/1,680 grains (where N is the number of end servers, and where 2 represents dual duplication of data to two different servers). As such, a primary copy of data is on one server and a second copy is on another second server, thereby adding server-level redundancy and fault tolerance.

User events coming through user events pipeline 430, in the example embodiment, are normalized and distributed out through queues 450 to personalization cluster 420 in near real-time (e.g., within a few seconds from their occurrence). In some embodiments, the user events are distributed and stored in STMF 426 for upcoming use (e.g., during the user's current session). As such, the user's recent activities may be promptly leveraged by evaluation engine 424 to provide personalization that reflects, for example, propensities the user may have for their current session interacting with the ecommerce system 402.

In the example embodiment, personalization platform 400 also sends user events entering user events pipeline 430 to an offline/batch processing database 440. Data associated with user events (e.g., transactional events 432, behavioral events 434) are stored in database 440 and used for batch processing 442 (e.g., nightly, weekly). In some embodiments, batch processing 442 provides functionality similar to data module 340 and/or analysis module 350 as shown and described in reference to FIG. 3. Batch processing 442, in some embodiments, includes training of models (not separately identified) that may be used by model evaluation engines 424 for producing personalization results, such as propensity models and/or results described above.

In some embodiments, the LTMFs 428 are generated on a weekly basis and transferred to one or more servers 422 by offline/batch processing 442. The LTMFs 428 are constant, and generated from an offline Hadoop process. Once released to servers 422, each end server invalidates any part of the STMF 426 that overlaps with the new LTMF 428. As time passes, offline/batch processing 442 pulls data from queues 450 with it then uses to make the next LTMFs 428.

In some embodiments, some batch data is distributed directly to the servers 422 (e.g., to LTMF 428), while other data is distributed to servers 422 through queues 450 (e.g., to STMF 426). For example, if batch data is high priority, changed, and below a pre-defined volume threshold, that data is distributed through queues 450. If a batch of data exceeds the pre-defined volume threshold (e.g., large profile updates for millions of users), then the batch data is passed through to LTMF 428 (unless there is some urgency for the data push).

Further, in the example embodiment, offline/batch processing 442 transmits user data associated with particular users to their associated personalization servers 422. As described above, models may be learned by personalization platform 400. These models may be generated or updated on a periodic basis (e.g., daily, weekly) and transferred to LTMFs 428 of personalization cluster 420, or to individual LTMFs 428 of particular personalization servers 422. The offline data includes, for example, user profile badges. In the example embodiment, user profile badges include some collection of variables which indicate a user's category affinity, price affinity, or other long term results which are computed offline. This data may also include demographic data from a number of sources, globally referenced user preferences such as the user's ad choice preference.

During operation, personalization platform 400 provides personalization services for one or more of the ecommerce system & services 402. More specifically, when one of the ecommerce system's 402 subsystems 410 provide certain services to or interactions with user 105 that are candidate services for personalization, that particular subsystem (referred to herein as the "calling subsystem") engages personalization platform 400 to perform personalization functionality associated with those services.

In the example embodiment, the calling subsystem generates a (not yet personalized) "intermediate results set" of data associated with the particular service and consults personalization platform 400 to provide personalization of the results set.

For example, presume user 105 is interacting with ecommerce system 402 to conduct a search for Wayne Gretzky sports memorabilia via a search feature provided by searching subsystem 410*a* (i.e., the calling subsystem), and the searching subsystem 410*a* provides a search autocomplete function. Upon the user 105 entering the characters "wa" into the search field (data referred to herein as a "query fragment", or a part of a query), and searching subsystem 410*a* engages to perform a personalized search autocomplete for the user's initial entry. The searching subsystem 410*a* generates an intermediate results set (i.e., based on the query fragment) that includes a plurality of possible result candidates (e.g., dozens or hundreds) that start with or otherwise involve the letters "wa", such as "watches", "washing machines", items located in or involving the state of "Washington", movie media for movies staring "Mark Walberg", and "Wayne Gretzky" memorabilia, to name but a few. As such, the calling subsystem generates an intermediate results set that is not yet personalized for the particular user 105. Other subsystems 410 may generate similar intermediate results sets associated with their provided functionality and services (e.g., deals listings from deals subsystem 410*b*) and, as such, may similarly have their results personalized by personalization system 400.

Continuing the example, the calling subsystem (e.g., searching subsystem 410*a*) generates and transmits a personalization request 460 to personalization platform 400 and, more specifically, to personalization cluster 420. The request 460 identifies the particular user (e.g., user 105), the type of personalization to be performed (e.g., search autocomplete) identified by, for example, a model identifier (e.g., identifying a particular model or model type to run), and the intermediate results set (e.g., the list of intermediate results starting with or involving "wa"). In some embodiments, request 460 may also include the individualized call data for the particular subsystem, such as the query fragment typed by the user for the searching subsystem (e.g., "wa"), and may also include a timeout value, and/or a maximum number of queries to return (e.g., top 10). In some embodiments, the calling subsystem 410 may perform some preliminary processing prior to issuing the personalization request 460. For example, searching subsystem 410*a* may prune the intermediate results set prior to submitting the request 460, for example, by evaluating the individual intermediate results for criteria such as recency, session activity, and quantity of item views. In other embodiments, the personalization server 422 may perform these tasks.

Upon receiving the request 460, personalization platform 400 identifies the particular user (e.g., user 105) and routes the personalization request 460 to the particular personalization server 422 assigned to that user (e.g., server 422*a* for user 105). Personalization server 422*a* processes request 460. More specifically, personalization evaluation engine 424 accesses user data from STMF 426 and/or LTMF 428 to process request 460 with data associated with the identified user (e.g., user 105). In the example embodiment, evaluation engine 424 scores each intermediate result from the intermediate results set based on the user data to generate a personalization score for each intermediate result.

In some embodiments, evaluation engine 424 applies a machine learned model (e.g., trained by offline/batch processing 442) to each intermediate result to generate the personalization score for the intermediate result. Further, in some embodiments, evaluation engine 424 uses user events (e.g., transactional events 432 and/or behavioral events 434) from STMF 426 and/or LTMF 428 to generate the personalization score. For example, the STMF 426 may be used directly to identify that there is a view item on something in a particular category. In some embodiments, STMF 426 may be used in aggregate to determine, for the current session, a breakdown of the categories being used. Additionally, STMF 426 may be used to provide a factor to the models that identify, for example, an event of type X followed in time period T by an event of type Y.

Continuing the example, presume user 105 had previously performed a search (i.e., a behavioral event) for "washing machines" 4 weeks prior, but during the current session (e.g., 5 minutes prior) had performed a search for "Wayne Gretzky rookie". Further, during the washing machines search, user 105 conducted no views of results presented, but during the recent Gretzky search the user 105 viewed 3 items, bid on one of the items, and marked one of the items for "watch." Personalization system 400 received the washing machines user event at the time, and distributed that event through to personalization server 422*a* and STMF 426, but that event has subsequently been moved to LTMF 428. At the time of the more recent user events (e.g., the Gretzky search event and subsequent views, bid, and watch events), personalization system 400 received the user events through user events pipeline 430 and similarly distributed the user events through queues 450 to STMF 426.

Now, during processing of the described personalization request 460 for search autocomplete personalization from searching subsystem 410*a*, personalization server 422*a* utilizes both the recently-distributed user events and the older user events to score each of the intermediate results. For example, consider the intermediate result associated with "Mark Walberg." The user 105 has no user events associated with Mark Walberg. As such, the evaluation engine 424 may generate a low personalization score for this result. For the "washing machine" intermediate result, the user 105 has a search event associated with washing machines, but there is only one event. Further, it is not a recent event (e.g., 4 weeks old), and the event generated no additional events. As such, the evaluation engine 424 may score this intermediate result slightly higher than the Mark Walberg result. For the "Wayne Gretzky" intermediate result, the user has a search event associated with Wayne Gretzky. Further, the event is recent (e.g., 5 minutes old), and the event generated several additional events (e.g., views, bid, and watch). As such, the evaluation engine 424 may score this intermediate result higher than the washing machine result and considerably higher than the Mark Walberg result.

Upon scoring each of the intermediate results in the results set, personalization platform 400 sends a response 462 back to the calling subsystem (e.g., searching subsystem 410a). In some embodiments, response 462 includes scores for each of the intermediate results provided in request 460. In other embodiments, personalization platform 400 scores each of the intermediate results but returns only a subset of the intermediate results. In one embodiment, personalization platform 400 returns only those intermediate results with a score over a pre-determined threshold. In another embodiment, personalization platform 400 returns a predetermined number of results. In some embodiments, the subset is an ordered list based on the personalization score (e.g., highest score first).

In some embodiments, personalization platform 400 includes a persistence service 412. Persistence service 412 may provide masks or overrides functionality from one or more ecommerce subsystems 410 for particular user events. A mask function may prevent tracking and/or use of certain types of user events within personalization system 400. For example, the user 105 may shopping for engagement rings under a shared account and may not want personalization platform 400 to factor in such events for future personalization. As such, some user events may be blocked from propagating through queues 450. An override functionality may be initiated when some data needs to be more quickly available to personalization server 422. An override event may be propagated such as to bypass user event pipeline 430 and sent straight to distribution queue 450 and on to the personalization server.

Figure 5:
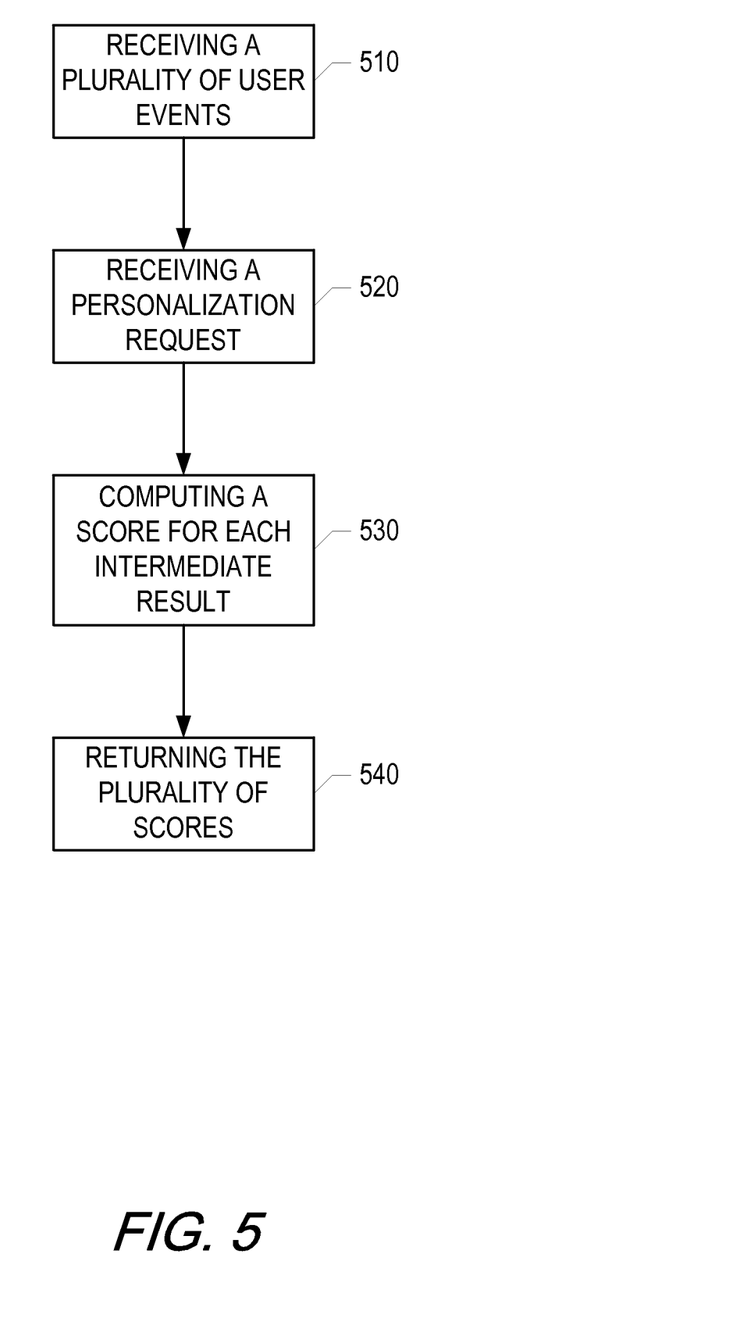
FIG. 5 depicts an example method for accessing user data to perform personalization.

FIG. 5 is an example method 500 for generating personalized results for an online user of an ecommerce system such as networked system 102 (shown in FIG. 1). In the example embodiment, method 500 is performed by a computing device including at least one processor and a memory. Method 500 includes receiving 510 a plurality of user events, each user event of the plurality of user events including one or more of a transactional event and a behavioral event associated with the online user. Method 500 also includes receiving 520 a personalization request from a requesting system, the personalization request including a plurality of intermediate results identified by the requesting system, each intermediate result representing a possible outcome that may be presented by the requesting system to the online user. Method 500 further includes computing 530 a score for each intermediate result of the plurality of immediate results based at least in part on the plurality of user events, thereby generating a plurality of scores. Method 500 also includes returning 540 the plurality of scores to the requesting system for use in personalizing an online experience of the online user.

In some embodiments, method 500 includes receiving a first user event of the plurality of user events, the first user event including a user identifier identifying the online user, determining a first personalization server from a plurality of personalization servers based at least in part on the user identifier, and transmitting the first user event to the first personalization server for said computing of the score.

In some embodiments, method 500 includes receiving a first user event of the plurality of user events as an override event, determining that the first user event represents an event that includes one or more of an override event and a priority event, and transmitting the first user event to a queueing module.

In some embodiments, method 500 includes receiving the plurality of user events, generating a personalization model for the online user based at least in part on the plurality of user events, and transmitting the personalization model to a first personalization server assigned to perform personalization for the online user.

In some embodiments, the requesting system provides a search autocomplete functionality for the online user, and the plurality of user events includes user events associated with one or more of (i) historical search events; (ii) historical search autocomplete events; and (iii) historical purchase events.

In some embodiments, the personalization request further includes a user identifier identifying the online user, and the method 500 further includes determining a first personalization server from the plurality of personalization servers based at least in part on the user identifier and processing the personalization request with the first personalization server.

In some embodiments, the first personalization server includes a short term memory (STM) and a long term memory (LTM), and the STM includes a first subset of user events of the plurality of user events occurring since a predetermined time, and the LTM includes a second subset of user events of the plurality of user events occurring prior to the predetermined time.

Modules, Components, and Logic

Figure 6:
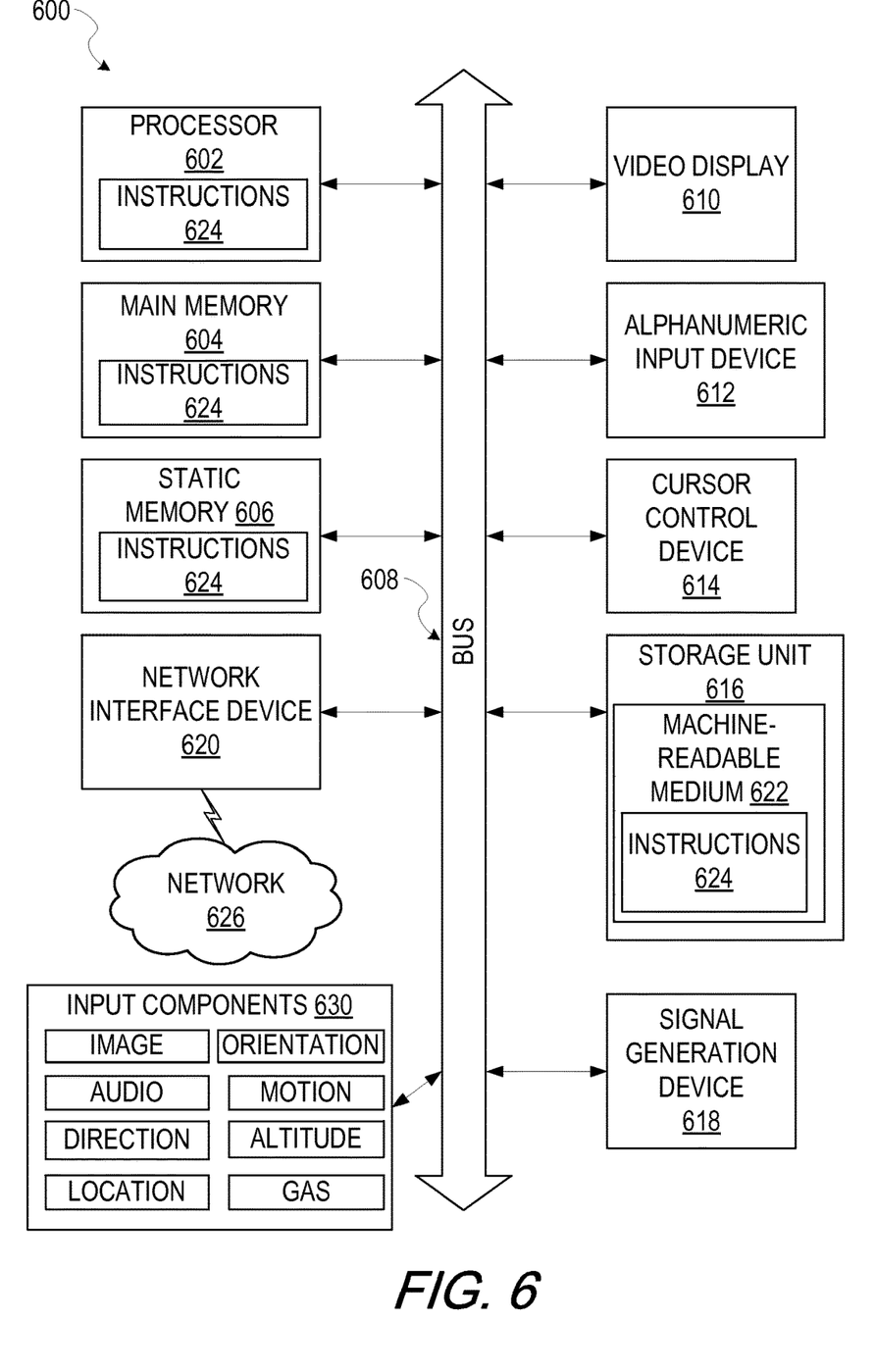
FIG. 6 illustrates a diagrammatic representation of a machine in the form of a computer system within which a set of instructions, for causing the machine to perform any one or more of the methodologies discussed herein, may be executed, according to an example embodiment.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 624 (e.g., software, a program, an application, an applet, an app, or other executable code) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine 600 is illustrated, the term "machine" shall also be taken to include a collection of machines 600 that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a video display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 embodying any one or more of the methodologies or functions described herein. The instructions 624 may also reside, completely or at least partially, within the main memory 604, within the static memory 606, within the processor 602 (e.g., within the processor's cache memory), or both, during execution thereof by the machine 600. Accordingly, the main memory 604, static memory 606 and the processor 602 may be considered as machine-readable media 622. The instructions 624 may be transmitted or received over a network 626 via the network interface device 620.

In some example embodiments, the machine 600 may be a portable computing device, such as a smart phone or tablet computer, and have one or more additional input components 630 (e.g., sensors or gauges). Examples of such input components 630 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 622 able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions 624. The term "machine-readable medium" shall also be taken to include any medium, or combination of multiple media, that is capable of storing instructions (e.g., instruction 624) for execution by a machine (e.g., machine 600), such that the instructions, when executed by one or more processors of the machine 600 (e.g., processor 602), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 622 is non-transitory in that it does not embody a propagating signal. However, labeling the machine-readable medium 622 as "non-transitory" should not be construed to mean that the medium is incapable of movement; the medium should be considered as being transportable from one physical location to another. Additionally, since the machine-readable medium 622 is tangible, the medium may be considered to be a machine-readable device.

The instructions 624 may further be transmitted or received over a communications network 626 using a transmission medium via the network interface device 620 and utilizing any one of a number of well-known transfer protocols (e.g., hypertext transfer protocol (HTTP)). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 622 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 602, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions described herein. As used herein, "processor-implemented module" refers to a hardware module implemented using one or more processors 602.

Similarly, the methods described herein may be at least partially processor-implemented, with a processor 602 being an example of hardware. For example, at least some of the operations of a method may be performed by one or more processors 602 or processor-implemented modules. Moreover, the one or more processors 602 may also operate to support performance of the relevant operations in a "cloud computing" environment or as a "software as a service" (SaaS). For example, at least some of the operations may be performed by a group of computers (as examples of machines 600 including processors 602), with these operations being accessible via the network 626 (e.g., the Internet) and via one or more appropriate interfaces (e.g., an application program interface (API)).

The performance of certain of the operations may be distributed among the one or more processors 602, not only residing within a single machine 600, but deployed across a number of machines 600. In some example embodiments, the one or more processors 602 or processor-implemented modules may be located in a single geographic location (e.g., within a home environment, an office environment, or a server farm). In other example embodiments, the one or more processors 602 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A personalization system to generate personalized results for an online user, the personalization system comprising:
   memory; and
   one or more processors communicatively coupled to the memory, the one or more processors being configured to cause the system to perform operations comprising:
     receive a plurality of user events, each user event of the plurality of user events including one or more user events selected from a group of user events consisting of: a transactional event and a behavioral event associated with the online user;

receive a personalization request for a session from a requesting system, the personalization request including an identifier of the user, a query fragment, and an indication of a query type of personalization that is to be performed, the query fragment having been received via a graphical user interface;

identify a plurality of intermediate results based on the query fragment, each intermediate result of the plurality of intermediate results representing a possible outcome that may be presented by the requesting system to the online user, wherein the plurality of intermediate results include a first term that was previously searched by the user and a second term that was previously searched by the user, wherein the first term and the second term are identified by accessing an electronic data storage that includes an electronic record of terms that were previously searched by the user;

compute a score for each intermediate result of the plurality of intermediate results based at least in part on the plurality of user events, thereby generating a plurality of scores, wherein a first score is computed for the first term based on a first search date of the first term, wherein a second score is computed for the second term based on a second search date of the second term, wherein the first search date is within the session and the second search date is outside the session;

generate a personalization response that includes the first term and the second term, wherein the first term is prioritized over the second term based on the first search date being with the session; and send the personalization response to the requesting system for use in personalizing an online experience of the online user.

2. The personalization system of claim 1, the one or more processors being configured to cause the system to perform operations comprising:

receive a first user event of the plurality of user events, the first user event including a user identifier identifying the online user;

determine a first personalization server from a plurality of personalization servers based at least in part on the user identifier; and transmit the first user event to the first personalization server for computing of the score.

3. The personalization system of claim 2, the one or more processors being configured to cause the system to perform operations comprising:

receive the first user event of the plurality of user events as an override event; and determine that the first user event represents an event that includes one or more of the override event and a priority event.

4. The personalization system of claim 1, the one or more processors being configured to cause the system to perform operations comprising:

receive the plurality of user events;

generate a personalization model for the online user based at least in part on the plurality of user events; and transmit the personalization model to a first personalization server assigned to perform personalization for the online user.

5. The personalization system of claim 1, wherein the plurality of user events includes user events associated with one or more of (i) historical search events; (ii) historical search autocomplete events; and (iii) historical purchase events.

6. The personalization system of claim 2, wherein the personalization request further includes a user identifier identifying the online user, wherein the one or more processors is further being configured to cause the system to perform operations comprising:

determine a first personalization server from the plurality of personalization servers based at least in part on the user identifier; and process the personalization request with the first personalization server.

7. The personalization system of claim 6, wherein the first personalization server includes a short term memory (STM) and a long term memory (LTM), wherein the STM includes a first subset of user events of the plurality of user events occurring since a predetermined time, wherein the LTM includes a second subset of user events of the plurality of user events occurring prior to the predetermined time.

8. A computer-implemented method to generate personalized results for an online user, the method performed by a personalization system including at least one processor and a memory, the method comprising:

receiving a plurality of user events, each user event of the plurality of user events including one or more user events selected from a group of user events consisting of: a transactional event, and a behavioral event associated with the online user;

receiving a personalization request for a session from a requesting system, the personalization request including an identifier of the user, a query fragment, and an indication of a query type of personalization that is to be performed, the query fragment having been received via a graphical user interface;

identifying a plurality of intermediate results based on a query fragment, each intermediate result of the plurality of intermediate results representing a possible outcome that may be presented by the requesting system to the online user, wherein the plurality of intermediate results include a first term that was previously searched by the user and a second term that was previously searched by the user, wherein the first term and the second term are identified by accessing an electronic data storage that includes an electronic record of terms that were previously searched by the user;

computing a score for each intermediate result of the plurality of intermediate results based at least in part on the plurality of user events, thereby generating a plurality of scores, wherein a first score is computed for the first term based on a first search date of the first term, wherein a second score is computed for the second term based on a second search date of the second term, wherein the first search date is within the session and the second search date is outside the session;

generating a personalization response that includes the first term and the second term, wherein the first term is prioritized over the second term based on the first search date being with the session; and sending the personalization response to the requesting system for use in personalizing an online experience of the online user.

9. The method of claim 8 further comprising:

receiving a first user event of the plurality of user events, the first user event including a user identifier identifying the online user;

determining a first personalization server from a plurality of personalization servers based at least in part on the user identifier; and
transmitting the first user event to the first personalization server for said computing of the score.

10. The method of claim 9 further comprising:
receiving the first user event of the plurality of user events as an override event; and
determining that the first user event represents an event that includes one or more of the override event and a priority event.

11. The method of claim 8 further comprising:
receiving the plurality of user events;
generating a personalization model for the online user based at least in part on the plurality of user events; and
transmitting the personalization model to a first personalization server assigned to perform personalization for the online user.

12. The method of claim 8, wherein the plurality of user events includes user events associated with one or more of (i) historical search events; (ii) historical search autocomplete events; and (iii) historical purchase events.

13. The method of claim 9, wherein the personalization request further includes a user identifier identifying the online user, the method further comprising:
determining a first personalization server from the plurality of personalization servers based at least in part on the user identifier; and
processing the personalization request with the first personalization server.

14. The method of claim 13, wherein the first personalization server includes a short term memory (STM) and a long term memory (LTM), wherein the STM includes a first subset of user events of the plurality of user events occurring since a predetermined time, wherein the LTM includes a second subset of user events of the plurality of user events occurring prior to the predetermined time.

15. A non-transitory computer-readable storage device having embedded therein a set of instructions which, when executed by one or more processors of a computer, causes the computer to execute operations comprising:
receive a plurality of user events, each user event of the plurality of user events including one or more user events selected from a group of user events consisting of: a transactional event and a behavioral event associated with an online user;
receive a personalization request for a session from a requesting system, the personalization request including an identifier of the user, a query fragment, and an indication of a query type of personalization that is to be performed, the query fragment having been received via a graphical user interface;
identify a plurality of intermediate results based on a query fragment, each intermediate result of the plurality of intermediate results representing a possible outcome that may be presented by the requesting system to the online user, wherein the plurality of intermediate results include a first term that was previously searched by the user and a second term that was previously searched by the user, wherein the first term and the second term are identified by accessing an electronic data storage that includes an electronic record of terms that were previously searched by the user;
compute a score for each intermediate result of the plurality of intermediate results based at least in part on the plurality of user events, thereby generating a plurality of scores, wherein a first score is computed for the first term based on a first search date of the first term, wherein a second score is computed for the second term based on a second search date of the second term, wherein the first search date is within the session and the second search date is outside the session;
generate a personalization response that includes the first term and the second term, wherein the first term is prioritized over the second term based on the first search date being with the session; and
send the personalization response to the requesting system for use in personalizing an online experience of the online user.

16. The computer-readable storage device of claim 15, wherein the instructions further cause the computer to:
receive a first user event of the plurality of user events, the first user event including a user identifier identifying the online user;
determine a first personalization server from the plurality of personalization servers based at least in part on the user identifier; and
transmit the first user event to the first personalization server for computing of the score.

17. The computer-readable storage device of claim 16, wherein the instructions further cause the computer to:
receive the first user event of the plurality of user events as an override event; and
determine that the first user event represents an event that includes one or more of the override event and a priority event.

18. The computer-readable storage device of claim 15, wherein the instructions further cause the computer to:
receive the plurality of user events;
generate a personalization model for the online user based at least in part on the plurality of user events; and
transmit the personalization model to a first personalization server assigned to perform personalization for the online user.

19. The computer-readable storage device of claim 15, wherein the plurality of user events includes user events associated with one or more of (i) historical search events; (ii) historical search autocomplete events; and (iii) historical purchase events.

20. The computer-readable storage device of claim 15, wherein the personalization request further includes a user identifier identifying the online user, wherein the instructions further cause the computer to:
determine a first personalization server from the plurality of personalization servers based at least in part on the user identifier; and
process the personalization request with the first personalization server.

* * * * *